April 5, 1960
R. L. SCHAPKER
2,931,173
COMPOUND ROTARY COMPRESSOR
Filed Aug. 24, 1954
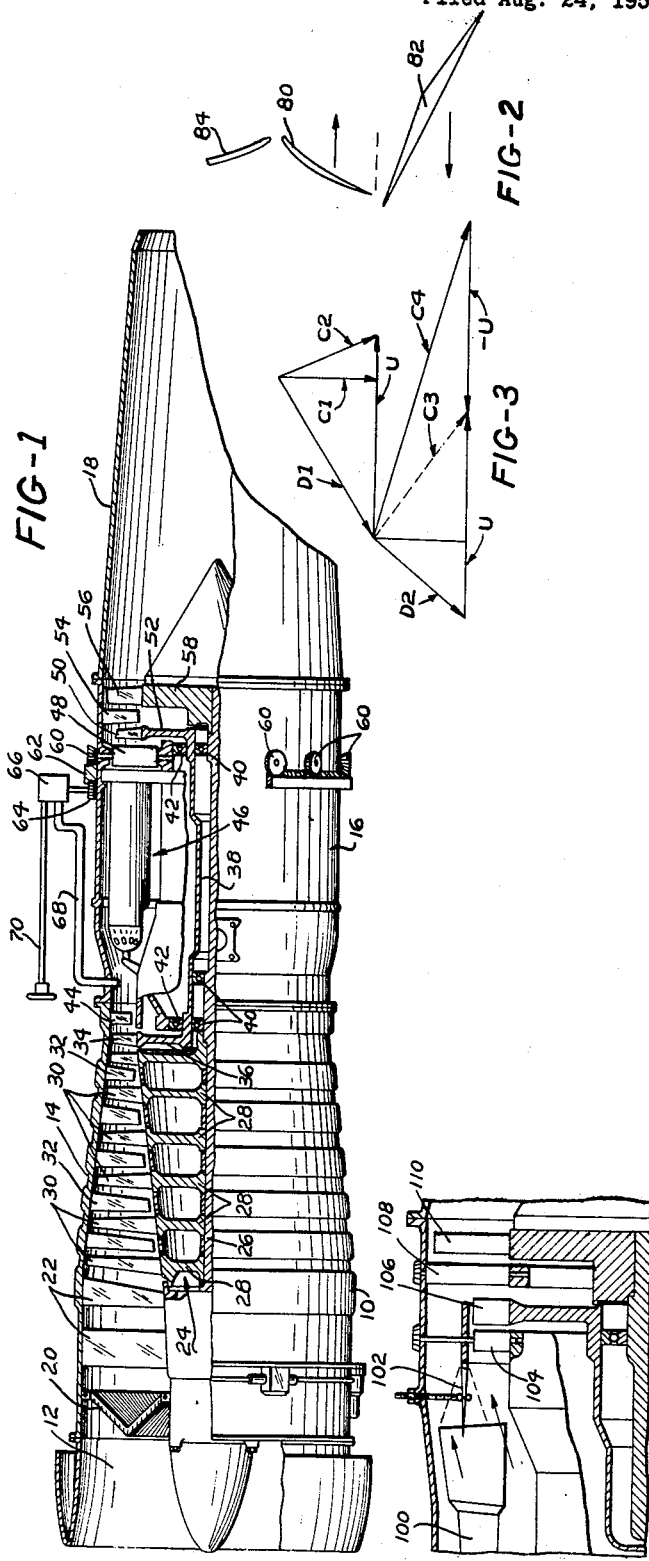
INVENTOR.
RICHARD L. SCHAPKER
BY Toulmin & Toulmin
ATTORNEYS United States Patent Office 2,931,173
Patented Apr. 5, 1960

2,931,173

COMPOUND ROTARY COMPRESSOR

Richard L. Schapker, Cincinnati, Ohio

Application August 24, 1954, Serial No. 451,847

4 Claims. (Cl. 60—39.16)

This invention relates to gas turbine power plants and in particular to improvements in connection with the compressors thereof.

In considering the ways in which the cycle efficiency of a gas turbine power plant could be increased, it will be evident that two of the principal points at which the cycle efficiency could be increased would be the turbine inlet temperature and the compressor's pressure ratio.

In connection with the turbine inlet temperature, this is largely dependent upon metallurgical considerations and at the present time the turbine inlet temperatures are about as high as can be employed with known alloys that are otherwise suitable for use in connection with the turbine structures.

The present invention accordingly deals in particular with a method of improving the cycle efficiency of a gas turbine power plant by increasing the compressor pressure ratio.

In connection with the problem of increasing the compressor pressure ratio, present compressor arrangements in gas turbine powerplants operate at a relatively high degree of efficiency and are likewise driven at speeds that are about as high as is desirable to go because of the tremendous centrifugal forces that are developed on the rotating parts and because of the considerations of the fluid flow through the stages of the compressor.

Certain consideration has been given to the use of a supersonic compressor to achieve greater pressure rise through each stage of the compressor. For example, the pressure ratio theoretically attainable for a rotor blade relative Mach number of 0.95, under conditions of NACA standard temperature and pressure, which is the practical limit for a subsonic compressor, is 1.79, whereas for a rotor blade relative Mach number of 2.0 which could easily obtain with a supersonic compressor, is 7.82. It will be evident that a supersonic compressor would have considerable advantage over a subsonic compressor at least with respect to the pressure ratio obtainable.

A prime disadvantage however in connection with supersonic compressors is the rotational speed at which the compressors must be driven and the large starting power requirements because of this necessary high speed.

Having the foregoing in mind, it is a primary object of the present invention to provide a compressor arrangement particularly adapted for use in a gas turbine powerplant in which the advantages are obtained of the high pressure ratio of a supersonic compressor while avoiding the problems encountered in connection with known supersonic compressor arrangements.

A still further object of the present invention is the provision of a compressor arrangement for a gas turbine powerplant which will be stable in operation and which will have a higher pressure ratio than can be obtained by any practical arrangement of a subsonic compressor.

A still further object of the present invention is the provision of a compressor arrangement for a gas turbine powerplant in which the advantages of a supersonic compressor will be obtained but without requiring the large amount of power for starting the compressor that obtains with known supersonic compressor arrangements.

A still further object of this invention is the provision of the combination of a turbine and a compressor which is flexible in operation but stable under all conditions of operation.

These and other advantages of this invention will become more apparent upon reference to the following specification taken in connection with the accompanying drawings, wherein:

Figure 1 is a view partly in section showing a turbojet engine constructed according to my invention;

Figure 2 is a diagrammatic view showing a typical blade arrangement by means of which my invention can be practiced and which illustrates the principles of my invention;

Figure 3 is a vector diagram showing the relative velocities that obtain during the operation of the compressor illustrated in Figure 2; and Figure 4 is a diagrammatic representation of a modified arrangement providing for mass control of the engine discharge delivered to the turbine stages.

Referring to the drawings somewhat more in detail, the engine of Figure 1 comprises an outer housing portion 10 which may be in several sections including the inlet section 12, the compressor section 14, the engine section 16, and the discharge section or tailpipe 18, all bolted together to form a unitary housing.

Inside the compressor section 14 is a screening arrangement 20 and a plurality of vanes 22 which may be used for straightening out the air-flow into the compressor or for giving it a predetermined amount of prewhirl in the direction of rotation of the rotor 24. The rotor 24 takes the form of a shaft 26 having mounted thereon a plurality of disc members 28 each of which include radially projecting compressor blades 30. There are 6 stages in the compressor section made up of the blades 30 and mounted within the compressor section 14 of the housing 10 are the stationary blades 32 which cooperate with the rotating blades 30 in providing for axial flow of air through the compressor with a simultaneous increase in pressure thereof.

It might be in order at this point to say that an axial flow type pressure is to be preferred in service of the type disclosed because of its straight through flow characteristics, its high flow rates and peak efficiency, and its frontal area considerations. According to my invention the first six stages that have just been described operate at subsonic flow in a substantially conventional manner. The pressure ratio however developed by the six stage subsonic compressor illustrated is not sufficient to obtain the degree of efficiency desired.

According to my invention this pressure ratio is materially increased by adding a seventh stage to the compressor which operates at supersonic flow and this is sufficient to increase the pressure ratio of the compressor to the point that efficient operating conditions will obtain. This supersonic stage comprises the radial blades 34 mounted about the periphery of a disc 36 that is fixed to tubular drive shaft 38 arranged concentrically with shaft 26 and journaled thereon as by the anti-friction bearings indicated at 40. The shaft 26 may have other supporting bearings and in addition there may also be provided anti-friction bearings as at 42 between tubular shaft 38 and fixed portions of the engine for supporting the rotating elements thereof. The supersonic compressor also includes stationary vane means 44 which deflect or straighten out the air-flow before it reaches the burners which are generally indicated at 46.

The burners 46 discharge toward tailpipe 18 through a turbine which consists of inlet vanes 48, vanes 50 on a disc 52 and vanes 56, that are mounted on a disc 58 fixed to the end of shaft 26.

Vanes 50 and 56 are adjusted so that the shafts 38 and 26 operate in opposite directions and vanes 34 of the supersonic compressor stage are thus inclined in an opposite direction to those of the vanes 30 of the subsonic compressor stages.

Inasmuch as it may be desirable for the supersonic compressor stage to operate at a different speed than the speed of operation of the subsonic, the inlet vanes 48 may advantageously be mounted on pintles so as to be adjustable with regard to their inclination to the flow of gases through the turbine. Adjustment of the inlet vanes may be accomplished by providing the outermost pintle portion of each with a gear 60 all of which mesh with a common ring gear 62 that is adjustable circumferentially of the housing portion of the engine to adjust the vanes angularly. This adjustment may be accomplished manually, and the ring gear may be fixed in any desired position of adjustment if so desired.

However, it is also contemplated to provide means for adjusting the angle of the inlet vanes to meet changing flight conditions. This may be accomplished by arranging a pinion 64 to mesh with teeth on ring gear 62 so that rotation of the pinion will adjust the ring gear. Pinion 64 may be controlled by an operator 66 which is pressure responsive and which is connected by a pilot conduit 68 at a point internally of the engine housing where the compressor discharge pressure can be detected.

In this manner the inlet vanes 48 can be arranged to respond to the compressor discharge pressure so as to maintain a substantially constant compressor discharge pressure. In order to provide for adjustability of the discharge pressure of the compressor there may be provided a manual adjusting mechanism 70 which may lead to the control cabin of the plane for adjustment therein of the operator 66.

By way of explanation of what occurs in a compressor characterized in the combination of counter-rotating stages with the last stage operating at a supersonic flow and the preceding stages operating at subsonic flow, reference may be had to Figures 2 and 3. Figure 2 is a simplified diagram showing a single subsonic compressor stage at 80 and a single supersonic compressor stage at 82. The vector diagram of Figure 3 shows the relative velocities that obtain in connection with the diagram of Figure 2. A rotational speed is selected for purposes of the example of about 1000 feet per second of the blades 80 and 82 with blades 80 moving rightwardly and blade 82 moving leftwardly. At this selected speed it is desirable for there to be fixed vanes 84 imparting to the incoming air a pre-whirl in the direction of the rotation of the subsonic blades 80 in order to obtain stable operation in the subsonic stage. The vector C–1 in Figure 3 shows the direction of the incoming air as it reaches pre-whirl vanes 84 and vector C–2 represents the direction of the air as it leaves pre-whirl vanes 84 and approaches vanes 80 of the subsonic stage.

The vector D–1 which represents the vector sum of C–2 and the vector +U, which represents the peripheral speed of the blades 80, is the relative velocity between the air and the blades 80. With the peripheral speed assumed at 1000 feet per second and with the incoming air assumed to be moving at 500 feet per second, the vector D–1 represents a velocity of 950 feet per second which is a Mach number of 0.84 which is satisfactory for stable and efficient subsonic compressor operation.

The exit velocity of the air from the blades 80 is indicated by the vector D–2 and when this is added to the vector +U at the bottom of the diagram this yields the vector C–3 which is the absolute velocity of the air issuing from the subsonic stage of the compressor. When vector C–3 is added to vector +U at the bottom of the diagram it yields vector C–4 which represents the relative velocity between the blades 82 of the supersonic stage and the air entering that stage. This velocity is on the order of about 1700 feet per second which gives a Mach number of about 1.5 for the supersonic stage. It will be noted that the peripheral velocity of both the subsonic and the supersonic stages in Figure 2 have been assumed at 1000 feet per second but it will be evident that these peripheral velocities need not be equal and that either could be increased or decreased. In any case, a sufficient relative velocity between the first (subsonic) and second (supersonic) sections of the compressor obtains to give supersonic compressor operation yielding a high pressure ratio without the disadvantages that have previously been encountered in attempts to operate purely supersonic compressors.

In addition to increasing the efficiency of operation of the turbo-jet engine, the use of a compressor arrangement according to my invention and which is characterized in having one or more counter-rotating supersonic stages in combination with one or more subsonic stages materially shortens the overall length of the engine by reducing the space necessary for the compressor portion thereof.

A slight increase in length of the turbine section is more than offset by the reduction in length gained in the compressor section.

In addition to the advantages obtained in reduced weight and reduced length of the turbo-jet engine a distinct advantage is obtained in adding flexibility to the engine in that the pressure at the discharge end of the compressor can readily be regulated to meet changing conditions and, additionally, according to the present invention, automatic control means can be provided for causing the compressor discharge pressure to change automatically to maintain predetermined operating conditions of the engine.

In Figure 4 there is shown a modification in which the discharge from engine 100 is adapted for being divided by an adjustable deflector blade 102 to provide for a certain quantity of gases being delivered to the adjustable inlet vanes 104 that precede the turbine element 106 associated with the supersonic compressor stage, while the remainder of the discharge from the engine combines therewith and passes through the adjustable vanes 108 that preceded the turbine stage 110 associated with the subsonic portion of the compressor.

This arrangement is of advantage because more power will probably be required by the subsonic stage of the compressor than is required for the supersonic stage thereof, whereas the Figure 1 arrangement is such that actually the greater power is available in the first stage of the turbine.

By way of definition: A compressor, according to the present application, is a device for increasing the total (stagnation) pressure of a fluid through which substantially axial flow takes place, and is made up of one or more stages, each stage consisting of a blade row rotary with respect to the compressor casing (housing), herein termed a rotor blade row, and a blade row stationary with respect to the compressor casing, herein called a stator blade row. A subsonic compressor is one in which the Mach number relative to the rotor blades of its first stage at the minimum, rotor blade leading edge radius is less than unity, and a supersonic compressor is one in which the Mach number relative to the rotor blades of its first stage at the minimum, rotor blade leading edge radius is greater than unity.

It will be understood that this invention is susceptible to modification in order to adapt it to different usages and conditions and, accordingly, it is desired to comprehend such modifications within this invention as may fall within the scope of the appended claims.

I claim:

1. In combination; a rotary bladed subsonic compressor section driven in one direction of rotation and operable to drive air axially therethrough at subsonic velocity relative to the leading edges of the blades of the section, a rotary bladed supersonic compressor section driven in the opposite direction of rotation positioned to receive directly and axially the discharge from the said subsonic section and operable to drive air at supersonic velocity relative to the leading edges of the blades of the section, concentric shaft means supporting said compressor sections, a turbine element on each shaft, a jet engine supplied with air by the compressor made up of said sections and arranged so that its discharge will actuate said turbine elements in respectively opposite directions of rotation, the entire engine discharge passing through the turbine element for the subsonic section, and deflector means positioned on the inlet side of the turbine element associated with said supersonic section adjustable for controlling the amount of discharge from the engine that passes therethrough.

2. In combination; a rotary bladed axial flow compressor having a subsonic section toward the inlet end and a supersonic counterrotating section at the discharge end directly axially receiving the discharge from the subsonic section, concentric shaft means supporting said sections, turbine elements on said concentric shaft means, jet engine means supplied with air by said compressor and arranged to discharge through said turbine elements with a portion of the discharge first encountering the turbine element associated with the supersonic compressor section and then the entire engine discharge passing through the other turbine element, and adjustable deflector means positioned at the inlet side of the turbine element associated with the supersonic compressor section for bypassing any desired portion of the engine discharge therearound.

3. In combination; a rotary bladed axial flow compressor having a subsonic section toward the inlet end and a supersonic counterrotating section at the discharge end directly axially receiving the discharge from the subsonic section, concentric shaft means supporting said sections, turbine elements on said concentric shaft means, jet engine means supplied with air by said compressor and arranged to discharge through said turbine elements with a portion of the discharge first encountering the turbine element associated with the supersonic compressor section and then the entire engine discharge passing through the other turbine element, and adjustable deflector means positioned at the inlet side of the turbine element associated with the supersonic compressor section for dividing the engine discharge into a portion passing through the turbine element and a portion which passes therearound, there also being adjustable inlet vanes at the inlet side of each of said turbine elements.

4. In combination; a rotary bladed axial flow compressor having a subsonic section toward the inlet end and a supersonic counterrotating section at the discharge end directly axially receiving the discharge from the subsonic section, concentric shaft means supporting said sections, turbine elements on said concentric shaft means, jet engine means supplied with air by said compressor and arranged to discharge through said turbine element with a portion of the discharge first encountering the turbine element associated with the supersonic compressor section and then the entire engine discharge passing through the other turbine element, and adjustable deflector means positioned at the inlet side of the turbine element associated with the supersonic compressor section for dividing the engine discharge into a portion passing through the turbine element and a portion which passes therearound, there also being adjustable inlet vanes at the inlet side of at least one of said turbine elements.

References Cited in the file of this patent

UNITED STATES PATENTS

| | | |
|---|---|---|
| 2,575,682 | Price | Nov. 20, 1951 |
| 2,587,649 | Pope | Mar. 4, 1952 |
| 2,645,412 | Sens | July 14, 1953 |
| 2,651,492 | Feilden | Sept. 8, 1953 |
| 2,659,528 | Price | Nov. 17, 1953 |
| 2,689,681 | Sabatiuk | Sept. 21, 1954 |
| 2,759,327 | Huber | Aug. 21, 1956 |

FOREIGN PATENTS

| | | |
|---|---|---|
| 687,365 | Great Britain | Feb. 11, 1953 |